United States Patent [19]

Wilson

[11] 4,192,322
[45] Mar. 11, 1980

[54] AXIAL FLOW SEPARATOR WITH STEPPED THRESHING BAR ROTOR

[75] Inventor: John E. Wilson, Colona, Ill.

[73] Assignee: Deere & Company, Moline, Ill.

[21] Appl. No.: 901,326

[22] Filed: May 1, 1978

[51] Int. Cl.² .............................................. A01F 12/18
[52] U.S. Cl. .............................. 130/27 T; 130/27 HA
[58] Field of Search ............ 130/27 R, 27 HA, 27 H, 130/30 E; 56/14.6

[56] References Cited

U.S. PATENT DOCUMENTS

| 1,651,037 | 11/1927 | Mitchell | 130/6 |
| 3,179,111 | 4/1965 | Morrison et al. | 130/27 |
| 3,203,428 | 8/1965 | Ausherman | 130/27 HA |
| 3,430,633 | 3/1969 | Mark | 130/27 R |
| 3,623,302 | 11/1971 | Schmitt | 56/14.6 |
| 4,136,704 | 1/1979 | Dyke | 130/27 T |

Primary Examiner—Russell R. Kinsey

[57] ABSTRACT

The rotor of an axial flow rotary separator carries a series of circumferentially spaced threshing bars which move in a threshing relationship with a cylindrical threshing grate as the rotor rotates and are characterized in having upstream and downstream portions, respectively providing greater and lesser grate clearances, the greater clearance of the upstream portion facilitating the entry of material into the threshing section of the separator.

12 Claims, 7 Drawing Figures

U.S. Patent   Mar. 11, 1980   Sheet 1 of 2   4,192,322
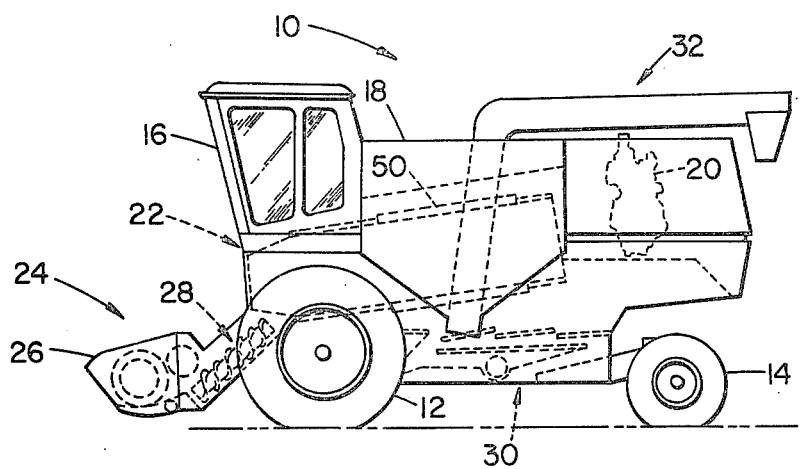
FIG. 1
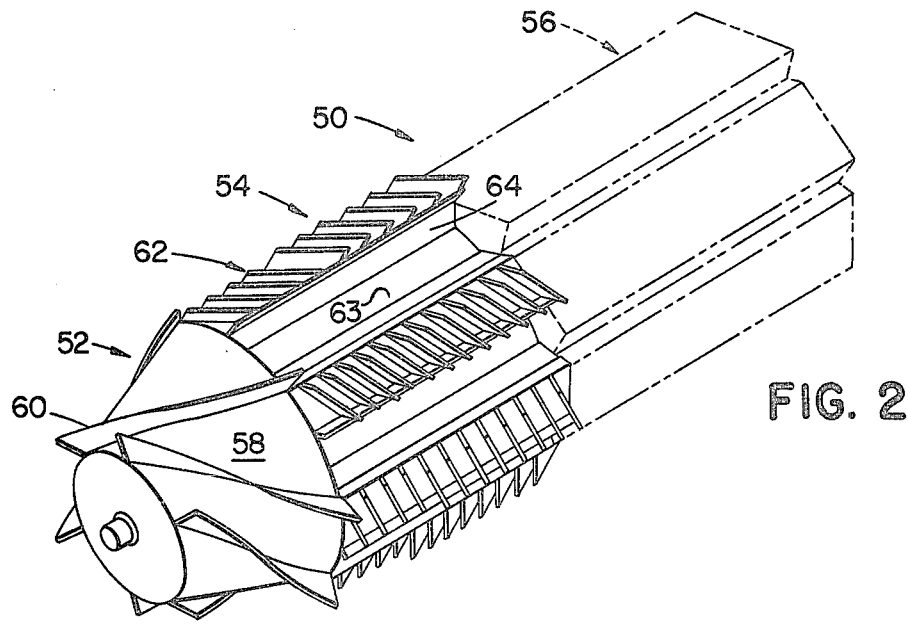
FIG. 2
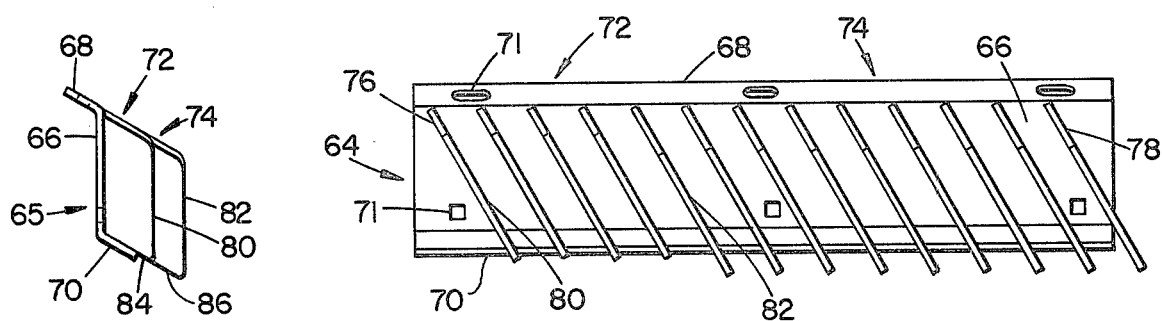
FIG. 3
FIG. 4

AXIAL FLOW SEPARATOR WITH STEPPED THRESHING BAR ROTOR

BACKGROUND OF THE INVENTION

This invention relates generally to axial flow rotary separators for combines of the type used for harvesting and treating grain crops and the like and more particularly to threshing bars for the rotors of such separators.

The general mode of operation of such combines and their separators is well known, as is the difficulty of feeding harvested crop material smoothly and efficiently into the threshing section where the threshing action depends on relatively small radial clearances between the rotor, and particularly its threshing bars, and the separator casing, and particularly its threshing grate or concave portions.

Typically a combine is equipped with a header which gathers crop material and delivers it by means of a feeder conveyor rearwards and upwards to the infeed portion of the separator. There the crop material enters a forward portion of the separator casing to be engaged by a rotor infeed portion which begins the transformation of the received generally linear flow of crop material into an annular mat spiraling rearward to enter the threshing portion of the separator, preferably smoothly and uniformly. Means such as helical guide elements on the inside of the housing or angled material moving blades on the rotor are provided to maintain the rearwardly spiraling movement of the crop material. This transformation of a generally diffuse mass of material delivered by the feeder conveyor into an attenuated mat thin enough to enter the threshing zone is particularly difficult in tough harvesting conditions, such as in high-moisture crops with long straw. Inevitably, portions of the material arrive at the inlet to the threshing zone in bunches or ropes consuming extra power and placing extra loads on the threshing bars as the material is made to conform to the physical limitations of the threshing zone inlet.

Attempts to better condition received crop material for entry into the threshing zone have included modification of the material control and conveying elements of the feed rotor itself and, as described in copending U.S. patent application Ser. No. 889,626, provision of a transition rotor portion, between feed rotor and threshing section, having a special rasp bar whose character changes along its length to increasingly attenuate the mat of crop material as it approaches the threshing section. It is also known, in a separator having a generally cylindrical rotor, to provide concave relief at the threshing section inlet. In the latter, extra radial clearance between rotor and concave is provided over a significant length of rotor at the threshing zone inlet by relieving the concave. However, this approach sets up a diameter-reducing constriction or step within the threshing zone to surmount which the mat of material must be further reduced in thickness in a radially inward direction, that is to say against the action of centrifugal force. The rotor is required to force crop material radially inwards over the fixed step.

SUMMARY OF THE INVENTION

Accordingly, it is an object of the present invention to provide a simple and efficient means for easing the flow of crop material into the confined annular space of the threshing section of an axial flow separator. More particularly it is an object to provide a threshing space or annulus which has a relatively enlarged radial clearance adjacent its inlet end and at least one downstream stage or lesser clearance but without any internal diameter-reducing discontinuity or step in the casing or grate of the threshing section. It is a feature of the invention to provide such a configuration in a separator in which the threshing housing has a regular cylindrical or downstream-diverging frustoconical form and surrounds a rotor threshing portion which includes elongated, circumferentially spaced threshing or rasp bars longitudinally stepped so that as the rotor rotates, the surfaces of revolution defined by the radially outermost portions of the rasp bars are approximately parallel to the adjacent portions of the housing surfaces and provide a first or inlet stage of a given radial clearance and at least one other stage donwstream of the first of lesser radial clearance, the boundary between the two stages being defined by the steps or offsets in the threshing bars. This stepped effect may be achieved, for example, by using rasp bar blades or ribs of two or more different heights and suitably mounted on the rotor frame or by providing mounting points on the frame for separate threshing bar assemblies such that a stepped diameter effect may be achieved with threshing bar ribs or blades of equal radial extent with respect to a threshing bar base or floor portion.

An advantage of the invention is that although a stepped or offset transformation from a greater to a lesser clearance may be used, it is provided in an active form, that is, on the moving rotor surface rather than on the fixed housing. To the extent that the rearwardly spiraling mat of crop material must surmount steps in the threshing bars and be compressed as it moves into a second threshing stage of reduced radial clearance, such compression is assisted by centrifugal force (the inner surface of the mat of material in effect moving radially outwards) and the live or moving action of the threshing bar ribs or blades.

BRIEF DESCRIPTION OF THE DRAWINGS

FIG. 1 is a semi-schematic side elevation of a self-propelled combine having an axial flow rotary separator embodying the invention.

FIG. 2 is an enlarged partial left three-quarter front perspective view of the rotor of the separator of the combine of FIG. 1.

FIG. 3 is a front end view of a threshing bar assembly of the rotor of FIG. 2.

FIG. 4 is a top (radially inward) view of the threshing bar assembly of FIG. 3.

DESCRIPTION OF THE PREFERRED EMBODIMENT

Figure 5:
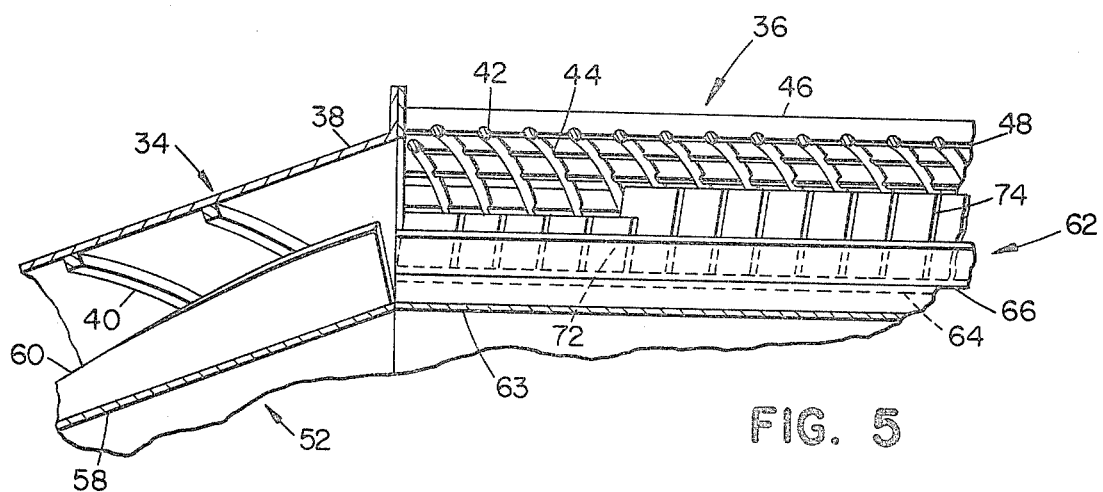
FIG. 5 is an enlarged cut-away partial view of the infeed and threshing sections of the separator.

The invention is embodied in a self-propelled axial flow combine of the type illustrated in FIG. 1. The combine includes a main separator body 10 supported on a pair of forward drive wheels 12 and steerable rear wheels 14 and includes a forwardly mounted operator's station 16, a grain tank 18 straddling the body behind the operator's station 16 and an engine 20 mounted towards the rear of the body 10 for propelling the combine over the ground and driving all its components. An axial flow separator 22 is carried towards the forward end of the body with its longitudinal axis extending approximately fore-and-aft and lying in the plane of the fore-and-aft center line of the combine body 10. A forwardly mounted header 24 for gathering crop material from a field and delivering it to the separator 22 includes a conventional cutting platform 26 and a feeder conveyor, such as the dual auger feeder conveyor 28 shown in the drawings. A cleaner 30 carried in the lower central part of the combine body 10 receives separated grain and chaff from the separator and delivers clean grain to the grain tank 18 by conventional means (not shown). Clean grain is unloaded from the combine tank by an unloading conveyor system 32.

The housing of the separator, shown partially in FIG. 5, includes a frusto-conical infeed portion 34 and attached rigidly to it and, extending concentrically downstream from it, a generally cylindrical grate portion 36. The housing infeed portion 34 includes an imperforate frusto-conical wall 38 carrying internally a series of raised helical ribs or lead bars 40. The grate 36, only the threshing portion of which is shown in FIG. 5, is in this embodiment of the low-friction type in which a series of spiral rods 42 are supported in notches 44 in a series of longitudinal spacer bars 46 so that the inner edges 48 of the spacer bars 46 are somewhat recessed, radially outwards of the inner cylindrical surface defined by the spiral rods 42.

The rotor 50 of the separator 22, shown in FIG. 2, is supported and driven concentrically within the separator housing by conventional means (not shown) and includes infeed 52, threshing 54 and separator 56 portions (the latter being shown in phantom outline only). The rotor infeed portion 52 consists principally of a frusto-conical body or frame 58 carrying a series of generally helical flights 60.

In the rotor threshing portion 54, six axially extending equally circumferentially spaced threshing bar assemblies 62 are carried on suitable rotor frame members, such as the cylindrical body 63 and threshing bar supports 64 indicated in FIGS. 2 and 5. Each threshing bar assembly 62 (FIGS. 3 and 4) consists of an elongated carrier 65 having a floor portion 66 disposed tangentially (with respect to the rotor's cylindrical periphery) and extending axially parallel to the rotor axis. Backwards sloping inwardly turned leading and outwardly turned trailing flanges 68 and 70, respectively, extend from the leading and trailing edges of the floor 66. These flanges help control crop material movement so as to improve threshing efficiency and also act as stiffeners reinforcing the carriers 65. Holes 71 in the floor 66 and in the leading flange 68 are used with suitable fasteners (not shown) for attaching the threshing bar assembly 62 to the rotor frame.

A plurality of threshing bar blades equally axially spaced and helically angled with respect to the rotor axis are attached rigidly to the carrier 65. A first series of threshing inlet blades 72 of a given height occupying the upstream or forward end of the carrier 65 and a second group of threshing blades 74, higher than the threshing inlet blades 72, are spaced over the remainder of the carrier 65. The general shape of both the inlet blades 72 and the threshing blades 74 is similar. Both have respectively backwardly sloping leading or shin edges 76 and 78, radially outward working edges 80 and 82, parallel to the floor 66, and trailing edges 84 and 86 backwardly sloping and butted against the trailing flange 70 of the carrier 65.

Figure 6:
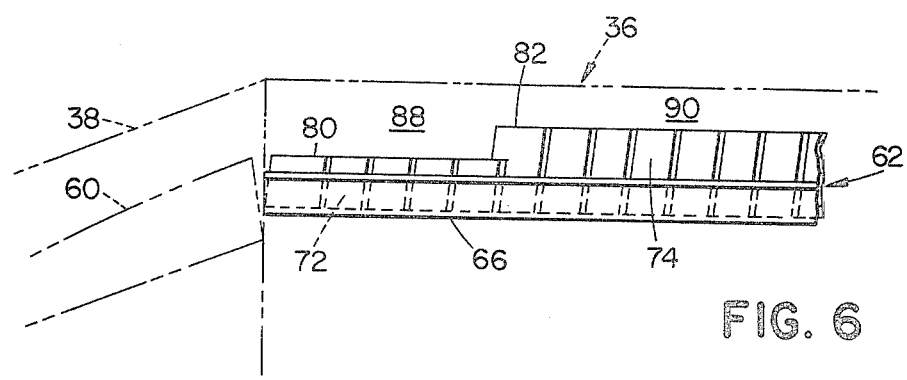
FIG. 6 is a diagrammatic view similar to FIG. 5 to illustrate the progressively decreasing radial clearances between rotor and housing of the separator.

FIG. 6 indicates diagrammatically the infeed and first 88 and second 90 threshing zones of the separator and in particular the decreasing radial clearance between rotor threshing portion 54 and housing grate 36, progressing rearwardly. In the infeed section relatively large clearances must be provided between the infeed housing wall 38 and the rotor body 58 and flights 60 of the rotor so that the flow of crop material can be received from the feeder conveyor 28 without back pressure or back feeding. Although towards the downstream end of the infeed portion, the flow of crop material has been transformed into an annular mat, typically the thickness of the mat is greater than that of the conventional radial clearance in the threshing zone and if typical or conventional clearances are maintained along the length of the threshing section, crop material does not readily enter it, especially in difficult harvesting conditions when material may arrive at the inlet to the threshing section in wadded or roped condition. The provision of a threshing zone with graded radial clearance between threshing bars and grate having a relatively large clearance at the inlet and smaller clearances downstream, where the graded clearance is achieved by modifying the rotor within a regular housing or grate, facilitates the entry of material into the threshing zone and smooth handling and progress thereafter. In the present embodiment, the grading of the threshing zone clearance is provided in the form of two discrete steps and is achieved by providing threshing bar blades 72 and 74 of two different heights, the lower blades 72 occupying approximately the upstream third of the threshing bar length, the remainder being occupied by the higher blades 74.

Figure 7:
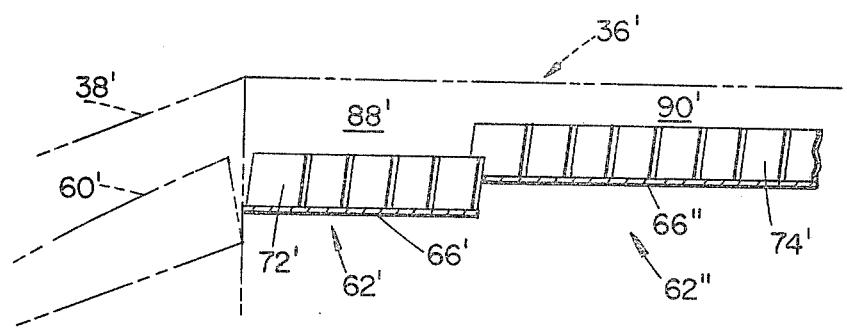
FIG. 7 is a view similar to FIG. 6 of an alternate embodiment of the invention.

FIG. 7 illustrates diagrammatically an alternate embodiment of the invention in which the threading bar assembly is separated into two portions 62' and 62", each including blades of equal height 72', 74', but mounted on the rotor with the floor portions 66' and 66" at different radial spacings from the axis to provide the stepped rotor effect.

In operation, the combine advances over a field and crop material harvested by the cutting platform 26 is delivered by way of the feeder conveyor 28 to the infeed portion of the separator 22. The rearwardly and upwardly directed flow of material is engaged by the rotor infeed portion 52 and accelerated circumferentially within the infeed housing 34, the helical angling of the blades 60 of the rotor and the lead bars 40 of the housing cooperating to deflect the crop material downstream so that it is delivered to the upstream end of the separator threshing portion as a rearwardly spirally mass or annular mat.

The material enters the first or inlet threshing portion or zone 88 (FIG. 6) and the rotor (including the helically angled threshing bar blades or ribs if present as they are in this embodiment in blades 72) and the spirally arranged rods 42 of the grate 36 cooperate to maintain the rearwardly spirally movement of the material. It is understood, of course, that due to friction and inertia, the crop material rotational speed is less than the peripheral speed of the rotor and in the first threshing zone 88, although radial clearance between threshing bar and grate is comparatively high, crop material is rubbed over the blades 72 and particularly over their working edges 80 and threshing action (removal of grain from the ears) begins. The rearwardly spiraling movement of the crop material continues and threshing is essentially completed in the second or final threshing zone 90. Centrifugal or radially outwards separation of threshed grain begins in the threshing zones 88 and 90, the grain passing outwards through the grate 36 and a similar separation continues in the separating portion of the separator (not shown) while straw continues spirally rearwards in the annular space between rotor and grate to be discharged at the rear of the separator. In this embodiment, the threshing grate extends and threshing action takes place over a 360° periphery but it is clearly within the scope of the invention for it to be used in conjunction with a threshing grate forming part of a housing fully enclosing a rotor but itself of less than 360° circumferential extent.

The provision of a graded or stepped rotor threshing portion has two important results: First, it makes the transition from the infeed portion to the threshing portion less abrupt and helps to maintain smooth and uniform material flow; and secondly, threshing action becomes more severe as the crop progresses through the threshing section. As threshing begins in the first zone 88, the relatively large clearance is appropriate in that the mass flow rate of the crop material is at its maximum and virtually all the grain content is still present, some of which can be threshed quite readily and easily from the ear or the like. Downstream (in the second threshing zone 90 of this embodiment) where radial clearance between rotor and grate is less, the mass flow rate of crop material is reduced, some grain and chaff having passed outwards through the grate and the remaining grain may offer more resistance to threshing. Testing has shown that for a given axial flow separator, modification of the threshing rotor and particularly the threshing bars to provide a graded, offset or stepped threshing zone may provide reductions of specific power consumption and increases of material handling capacity of the order of 50 percent.

It will be clear that the beneficial results of the invention may be achieved with embodiments of a wide range of dimension and configuration including frusto-conical as well as cylindrical separators. The following dimensions are an example only of some which have achieved successful results in the separator of the present embodiment in processing small grain such as wheat: In a cylindrical threshing section approximately 1,000 millimeters in length, each threshing bar assembly 62 was mounted parallel to the rotor axis with five blades 72 of reduced height at the upstream end of the bar (first threshing zone 88) and ten higher blades 74 occupying the remainder of the bar (threshing zone 90). Axial spacing of the blades was approximately 65 millimeters and blades were set at a lead or helical angle (relative to a circumferential direction) of 35°. Effective outside rotor diameter in the first and second threshing zones 88 and 90 respectively were 760 and 785 millimeters. Operating with the relatively low friction cylindrical grate 36, successful results were obtained with, for example, relatively low clearances in the first and second threshing zones respectively of 24 and 12 millimeters and, with coarse settings of 40 and 28 millimeters, respectively as conditions required.

The embodiment indicated in FIG. 7 offers advantages of design flexibility as well as permitting use of common blades (blades 72' and 74' may be identical). For example, the segmented threshing bar assemblies 62', 62" may be mounted so that the "step" between them is adjustable or threshing bar portions of different characteristics may be substituted.

I claim:

1. In a combine having an axial flow rotary separator for processing crop material and means for delivering crop material from a field to the separator, the separator including a generally cylindrical threshing housing having an upstream inlet and a threshing grate and including a threshing rotor having a frame and supported for rotation within the housing, the separator also including material control means for propelling crop material received from the field downstream through the threshing housing inlet and within the threshing housing as the rotor rotates, the rotor including at least two circumferentially spaced generally longitudinally extending elongated threshing bars carried by the frame, each bar having an upstream portion adjacent the threshing housing inlet and a downstream portion, each portion being spaced radially inwards from the grate and, as the rotor rotates, defining a surface of revolution and moving in a threshing relationship with the grate to thresh crop material propelled downstream by the material control means, each threshing bar being characterized in that the relative dispositions of the respective portions is such that as the rotor rotates, the surface of revolution defined by the upstream portion is substantially cylindrical and of smaller diameter than that defined by the downstream portion, the relatively greater clearance between rotor and grate adjacent the inlet facilitating propulsion of material into the threshing housing.

2. The invention defined in claim 1 further characterized in that in each threshing bar the radial spacing of the upstream portion from the grate is between approximately 1½ and 3 times the spacing of the downstream portion from the grate.

3. The invention defined in claim 1 further characterized in that each threshing bar portion includes an elongated carrier attached to the frame and a plurality of side-by-side axially spaced raised rib-like elements carried rigidly by the carrier each element angled in the same direction with respect the rotor axis so as to urge downstream crop material engaged by the elements.

4. The invention defined in claim 3 further characterized in that the rib-like elements of each portion are of uniform radial extent but those of the upstream portion are of lesser radial extent than those of the downstream portion.

5. The invention defined in claim 4 further characterized in that the axial extent of the downstream threshing bar portion is approximately twice the axial extent of the upstream portion.

6. The invention defined in claim 4 further characterized in that the radial clearance between the upstream threshing bar portion and the grate as the rotor rotates is approximately between 1½ and 3 times the radial clearance between the downstream threshing bar portion and the grate.

7. The invention defined in claim 1 further characterized in that at least a portion of the grate completely surrounds the rotor.

8. In an axial flow rotary separator for a combine of the type which advances over a field and harvests crop material for treatment in the separator including a generally cylindrical threshing casing having an upstream inlet for receiving harvested crop material and a grate and material control means for propelling crop material downstream within the casing, a threshing rotor supported for rotation within the casing and having opposite upstream and downstream ends and comprising:

a frame; and at least two circumferentially spaced threshing bars carried by the frame having axially spaced upstream and downstream ends radially spaced from the grate and the housing so that as the rotor rotates grain is threshed from the crop material between the rotor and the grate, being discharged radially through the grate and straw being propelled downstream and each threshing bar including an upstream inlet threshing portion adjacent the threshing casing inlet and a downstream final threshing portion, each portion including a plurality of raised radially outwardly directed threshing elements, the radially outward extremities of said elements defining a cylinder as the rotor rotates and the diameter of the cylinder defined by the inlet threshing portion being less than that of the cylinder defined by the downstream final threshing portion, thus facilitating entry of crop material into the inlet threshing portion.

9. The invention defined in claim 8 wherein each threshing bar includes an elongated carrier having a radially outward surface extending generally parallel to the rotor axis and the threshing elements comprise side-by-side radially extending blaldes, each blade angled in the same direction with respect to the rotor axis so as to urge downstream crop material engaged by the blades and the blades in the downstream final threshing portion being a greater radial extent than the blades of the upstream inlet threshing portion.

10. In an axial flow rotary separator for a combine including a threshing casing having a wall conforming substantially to a ruled surface of generally circular cross section and an upstream inlet, an improved threshing rotor supported for rotation within the casing and cooperating with the casing to thresh grain received through the inlet while propelling it spirally downstream and comprising;

a frame; and a plurality of threshing bars of axial extent supported by the frame, each bar stepped so as to define an upstream threshing portion adjacent the upstream inlet of the casing and a downstream threshing portion, each portion extending approximately parallel to the casing wall and spaced radially from said wall, the radial spacing of the upstream portion from the casing wall being greater than that of the downstream portion from the casing wall.

11. In an axial flow rotary separator for a combine having a threshing housing including a wall and a coaxial threshing rotor including a frame and rotating within the housing to define axially extending annular upstream and downstream threshing zones, the improvement in the rotor comprising:

at least two elongated threshing bars carried by the frame, each bar having upstream and downstream portions each approximately parallel to the threshing housing wall and offset with respect to one another and axially spanning the upstream and downstream threshing zones respectively, each upstream portion being disposed radially closer to the rotor axis than the downstream portion so that the upstream threshing zone is of greater radial thickness than the downstream threshing zone.

12. In an axial flow rotary separator for a combine including a threshing housing having an inside surface and a threshing rotor including a frame and mounted for rotation and extending within the housing, the improvement in the rotor comprising:

at least two elongated circumferentially spaced longitudinally stepped rasp bars carried by the rotor frame, each bar having contiguous upstream and downstream portions and each portion having radially outermost crop engaging surfaces disposed so as to define a surface of revolution approximately parallel to the radially adjacent portions of the housing inside surface as the rotor rotates, the diameter of the surface of revolution defined by the upstream portion of the bar being less than that of the downstream portion.

* * * * *